US009356791B2

(12) United States Patent  
Kowalewski (10) Patent No.: US 9,356,791 B2  
(45) Date of Patent: May 31, 2016

(54) METHOD FOR DETERMINING ACTIVE COMMUNICATION SESSIONS, COMMUNICATION SESSION INFORMATION SERVERS, METHOD FOR PROVIDING INFORMATION ABOUT ACTIVE COMMUNICATION SESSIONS AND DOCUMENT MANAGEMENT SERVERS (75) Inventor: Frank Kowalewski, Goettingen (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 926 days.

(21) Appl. No.: 13/061,716

(22) PCT Filed: Aug. 12, 2009

(86) PCT No.: PCT/EP2009/060444
§ 371 (c)(1),
(2), (4) Date: Mar. 2, 2011

(87) PCT Pub. No.: WO2010/026023
PCT Pub. Date: Mar. 11, 2010

(65) Prior Publication Data
US 2011/0153765 A1  Jun. 23, 2011

(30) Foreign Application Priority Data

Sep. 2, 2008 (DE) .......................... 10 2008 045 425

(51) Int. Cl.
*G06F 15/16* (2006.01)
*H04L 12/18* (2006.01)
(Continued)

(52) U.S. Cl.
CPC ........ *H04L 12/1813* (2013.01); *H04L 65/1069* (2013.01); *H04L 65/4061* (2013.01); *H04W 4/10* (2013.01); *H04W 76/005* (2013.01)

(58) Field of Classification Search
USPC ........................................................ 709/206
See application file for complete search history.

(56) References Cited

U.S. PATENT DOCUMENTS 8,010,611 B2 *  8/2011  Wang et al. ................... 709/206
8,407,357 B2 *  3/2013  Oh et al. ...................... 709/230
(Continued)

FOREIGN PATENT DOCUMENTS

CN     1794692 A    6/2006
CN     1863341 A   11/2006
(Continued)

OTHER PUBLICATIONS

English abstract of CN1863341A; Nov. 15, 2006.
(Continued)

*Primary Examiner* — Hua Fan
(74) *Attorney, Agent, or Firm* — Schwabe, Williamson & Wyatt, P.C.

(57) ABSTRACT

A method for ascertaining active sessions may include receiving a request to ascertain active sessions by a session information server; transmitting respective challenges for document contents, which indicate whether sessions are currently active, from the session information server to at least one document management server which has a respective associated communication session server, wherein in the case of precisely one document management server the latter has at least two associated session servers; receiving respective challenge responses from the document management server, which indicate active sessions controlled by the session server associated with the respective document management server or which indicate that such sessions currently do not exist, by the session information server; and transmitting a first response, which indicates one or more active sessions controlled by the session servers associated with the document management server or which indicates that such sessions currently do not exist, by the session information server.

32 Claims, 6 Drawing Sheets (51) Int. Cl.
*H04L 29/06* (2006.01)
*H04W 4/10* (2009.01)
*H04W 76/00* (2009.01)

(56) References Cited

U.S. PATENT DOCUMENTS

| | | | | |
|---|---|---|---|---|
| 2002/0174171 | A1* | 11/2002 | Byrisetty et al. | 709/203 |
| 2006/0053208 | A1* | 3/2006 | Laurila et al. | 709/206 |
| 2007/0071210 | A1* | 3/2007 | Schmidt et al. | 379/202.01 |
| 2007/0124294 | A1* | 5/2007 | Sun et al. | 707/3 |
| 2007/0135106 | A1 | 6/2007 | Sung et al. | |
| 2007/0189203 | A1 | 8/2007 | Sung et al. | |
| 2007/0203995 | A1* | 8/2007 | Wang et al. | 709/206 |
| 2007/0226295 | A1* | 9/2007 | Haruna et al. | 709/204 |
| 2008/0009303 | A1 | 1/2008 | Westman et al. | |
| 2008/0208953 | A1* | 8/2008 | Tian | 709/201 |
| 2008/0249997 | A1 | 10/2008 | Sun et al. | |
| 2008/0270553 | A1* | 10/2008 | Mu | 709/206 |
| 2008/0281931 | A1* | 11/2008 | Oh et al. | 709/206 |
| 2009/0125803 | A1 | 5/2009 | Bao et al. | |
| 2009/0279455 | A1* | 11/2009 | Wang et al. | 370/260 |
| 2010/0312847 | A1* | 12/2010 | Boberg et al. | 709/206 |
| 2011/0282957 | A1* | 11/2011 | Wang et al. | 709/206 |
| 2012/0221648 | A1* | 8/2012 | Bertin et al. | 709/206 |
| 2012/0259934 | A1* | 10/2012 | Laurila et al. | 709/206 |

FOREIGN PATENT DOCUMENTS

| | | |
|---|---|---|
| EP | 1968263 A1 | 9/2008 |
| WO | 2007068195 A1 | 6/2007 |
| WO | 2008049348 A1 | 5/2008 |

OTHER PUBLICATIONS

Laurila Antti: "XDM Search Architecture and Protocol",(Oct. 18, 2005), XP002541733, Retrieved from the Internet: OMA-PAG-2005-0552-XDM-Search-Architecture-and-Protocol, pp. 1-6.

Lan Wang et al.: "A study on session setup for group communications in push-to-talk over cellular using rich presence"; Communications and information technologies, 2007. Iscit 2007, International Symposium on, IEEE, PI, (Oct. 1, 2007), XP031166500, pp. 415-420.

Open Mobile Alliance: "XML Document Management Requirements", Candidate Version 1.0—Mar. 17, 2005, XP-002510124, OMA-RD-XDM-V1_0-20050317-C, pp. 1-50.

Open Mobile Alliance: "XML Document Management (XDM) Specification", Candidate Version 1.0—Jan. 10, 2006, XP-002510122, OMA-TS-XDM_Core-V1_0-20060110-C, pp. 1-52.

Open Mobile Alliance: "XML Document Management Architecture" Candidate Version 1.0—Jan. 10, 2006, XP-002510123, OMA-AD-XDM-V1_0-20060110-C, pp. 1-20.

Open Mobile Alliance: "Shared XDM Specification", Candidate Version 1.0—Jan. 10, 2006, XP-002510125, OMA-TS-XDM_Shared-V1_0-20060110-C, pp. 1-18.

Urpalainen J.: "An Extensible Markup Language (XML) Patch Operations Framework Utilizing XML Path Language (XPath) Selectors", RFC 5261, Sep. 2008, Network Working Group, pp. 1-40.

Rosenberg J.: "The Extensible Markup Language (XML) Configuration Access Protocol (XCAP)", RFC 4825, May 2007, Network Working Group, pp. 1-72.

Open Mobile Alliance: "XML Document Management (XDM) Specification", Approved Version 1. 1—Jun. 27, 2008, OMA-TS-XDM_Core-V1_1-20080627-A, pp. 1-39.

Open Mobile Alliance: "XML Document Management Requirements", Approved Version 1. 1—Jun. 27, 2008, OMA-RD-XDM_V1_1-20080627-A, pp. 1-50.

Office action received in Chinese Patent Application No. 200980143330.3, mailed Apr. 1, 2013, 19 pages; pp. 1-13 in English, pp. 14-19 in German.

International Preliminary Report on Patentability received in PCT/EP2009/060444, dated Aug. 3, 2011, 22 pages; pp. 1-12 in English, pp. 13-22 in German.

Written Opinion received in PCT/EP2009/060444, dated Feb. 3, 2011, 20 pages; pp. 1-11 in English, pp. 12-20 in German.

International Search Report received in PCT/EP2009/060444, dated Nov. 3, 2010, 11 pages; pp. 1-5 in English, pp. 6-11 in German.

* cited by examiner

METHOD FOR DETERMINING ACTIVE COMMUNICATION SESSIONS, COMMUNICATION SESSION INFORMATION SERVERS, METHOD FOR PROVIDING INFORMATION ABOUT ACTIVE COMMUNICATION SESSIONS AND DOCUMENT MANAGEMENT SERVERS

RELATED APPLICATIONS

The present application is a national stage entry according to 35 U.S.C. §371 of PCT application No.: PCT/EP2009/060444 filed on Aug. 12, 2009, which claims priority from German application No.: 10 2008 045 425.7 filed on Sep. 2, 2008.

TECHNICAL FIELD

Various embodiments relate to a method for ascertaining active communication sessions, a communication session information server, a method for providing a piece of information about active communication sessions, and a document management server.

BACKGROUND

Communication with technical means between a finite number of particular participants is referred to as a communication session. In a communication system, the right to communicate (communication right) is usually controlled by means of a communication right allocation mechanism. As part of this mechanism, the participant in a communication session requests a communication right from a communication session server, and the server approves the right or does not approve it.

By way of example, conference systems allow communication appliances to be used for communication between a plurality of users.

In order to allow ordered communication, usually not all the participants in a conference receive the right to communicate via a particular medium (such as audio, video, text, etc.) at the same time. On the contrary, the communication rights are usually allocated on the basis of certain prescribed rules.

In a large conference room, a conference system is used which provides the participants with a plurality of microphones and loudspeakers for voice communication for example. The microphones need to be switched on by the respective speaker in order to use them. A microphone which has been switched on blocks all other microphones, so that only one speaker can ever be active. By way of exception, it is also possible for a further microphone (for example the microphone of the head of the conference) to be active at the same time. The right to speak is thus only ever given to one participant and possibly to the head of the conference.

A comparable service also exists for mobile radio telephones: Push-to-Talk (PTT). The technical term Push-to-Talk denotes that the speaker usually operates a special key on the mobile radio telephone in order to send messages, as in the case of a "walkie-talkie" (a small radio telephone set). The transmission of messages from other users of this service is blocked during this time. Examples of PTT services are "Direct Connect" from Nextel in the USA and "Push-to-Talk over Cellular" (PoC) from the Open Mobile Alliance (OMA).

In a Push-to-Talk conference system, communication rights are requested and allocated by means of what is known as the "RealTime Control Protocol" (RTCP), for example.

In a conference system as proposed by the IETF (Internet Engineering Task Force) committee, an example of an Internet-based conference system, and in a Push-to-Talk conference system (also called a PTT conference system) today, communication sessions are controlled using what is known as the "Session Initiation Protocol" (SIP), for example.

Conference systems based on the IETF and PTT conference systems usually have a centralized architecture. This means that the participants in such conference systems do not communicate with one another directly but rather communicate with one another via a central communication session server (also called a telecommunication server or telecommunication conference server). The central communication session server is arranged in the non-mobile part of the telecommunication network in the case of a mobile communication system or conference system, as explained in more detail below.

A communication session in a communication system may be active or not active. A communication session is active if the communication system simply provides the necessary means for communication. If the means are not available (for example because the necessary communication channels for transmitting data have not yet been prepared), the communication session is not active.

A communication session in a communication system or conference system is initiated by initiating the setup of the necessary communication means. By way of example, the initiation can be performed by one of the communication session participants by virtue of it instructing a central communication session server to provide the communication means. In this case, the participant notifies the server of which participants are intended to be able to communicate with one another.

The participants in the communication session can be specified by a list of participant addresses or by an address which refers to a list of participant addresses (group address).

What is known as a predefined PTT group is specified in a group server by an address which refers to a list of participant addresses. What is known as a chat group is likewise specified in a group server by an address which refers to a list of participant addresses. In contrast to a predefined PTT group, the members of a chat group are not all invited to initiate a chat communication session at once. On the contrary, the participants in a chat group can join a chat communication session by dialing up separately. What is known as an ad hoc group is specified by a list of participant addresses. The addresses are specified with the invitation to join an ad hoc communication session by the inviter.

A drawback is that a potential participant in communication sessions has no information about ongoing, that is to say, active, communication sessions. He must first of all use his communication session participant appliance to dial up into a communication session or to invite himself to a communication session in order to be able to establish whether other participants are participating or ready to participate in this communication session. If a potential user is interested in a plurality of communication sessions, it is complex and time-consuming for him to find out which communication sessions are currently active. Therefore, he possibly misses a communication session of interest or a part of it.

SUMMARY

It would be desirable to be able to obtain information about active communication sessions more easily and more quickly.

In line with various exemplary embodiments of the invention, a request prompts active communication sessions to be automatically ascertained and reported back, with optionally only those communication sessions which fulfill further prescribable conditions being reported back.

A method for ascertaining active communication sessions involves a request to ascertain active communication sessions being received by a communication session information server. Respective challenges for document contents which indicate whether the communication sessions are currently active are sent from the communication session information server to at least one document management server which has at least one respective associated communication session server, wherein in the case of precisely one document management server the latter has at least two associated communication session servers. Respective challenge responses from the at least one document management server, which indicate one or more active communication sessions controlled by the at least one communication session server associated with the respective document management server or which indicate that such communication sessions currently do not exist, are received by the communication session information server. A first response, which indicates one or more active communication sessions controlled by the communication session servers associated with the at least one document management server or which indicates that such communication sessions currently do not exist, is sent by the communication session information server.

A communication session information server has a request acceptance unit which is configured to receive a request to ascertain active communication sessions. It has a challenge unit which is configured to send respective challenges for document contents which indicate whether the communication sessions are currently active to at least one document management server which has at least one respective associated communication session server, wherein in the case of precisely one document management server the latter has at least two associated communication session servers, and which is configured to receive respective challenge responses from the at least one document management server which indicate one or more active communication sessions controlled by the at least one communication session server associated with the respective document management server or which indicate that such communication sessions currently do not exist. In addition, it has a response unit which is configured to send a first response which indicates one or more active communication sessions controlled by the communication session servers associated with the at least one document management server or which indicates that such communication sessions currently do not exist.

A method for providing a piece of information about active communication sessions involves a piece of information being received by a document management server, said piece of information indicating one or more active communication sessions controlled by a communication session server associated with the document management server. The received piece of information is stored in a document managed by the document management server, wherein the document contains a list in which active communication sessions controlled by the communication session server need to be indicated. A challenge from a communication session information server for document contents which indicate whether communication sessions are currently active is received. The document is investigated for active communication sessions which are controlled by the communication session server. A challenge response which indicates one or more active communication sessions controlled by the communication session server or which indicates that such communication sessions currently do not exist is sent from the document management server to the communication session information server.

A document management server has a reception unit which is configured to receive a piece of information which indicates one or more active communication sessions controlled by a communication session server associated with the document management server and which is configured to receive a challenge from a communication session information server for document contents which indicate whether communication sessions are currently active. In addition, the document management server has a document management unit which is configured to store the received piece of information in a document managed by the document management server, wherein the document contains a list in which active communication sessions controlled by the communication session server need to be indicated. It has an investigation unit which is configured to investigate the document for active communication sessions which are controlled by the communication session server. It also has a transmission unit which is configured to send a challenge response which indicates one or more active communication sessions controlled by the communication session server or which indicates that such communication sessions currently do not exist to the communication session information server.

A communication session information server, subsequently also called an information server, is a server which can ascertain information about communication sessions and can send it to a challenging station. A server is a technical unit which provides or controls a service, for example a communication service. A server may contain both hardware, e.g. electric circuits, processors, storage media, etc., and software, e.g. operating systems and control programs. A communication session is communication using technical means between a finite number of particular participants. A communication session server is a server which provides or controls communication sessions, for example controls the connection setup and the allocation of communication rights for communication sessions in a communication system. A document management server is a server which manages electronic documents. Other units, for example other servers, can deliver documents for safe-keeping to a document management server or can deliver information for entry into documents which are present on or managed by the document management server. They are able to direct search requests to a document management server. A document management server can provide a search function for the purpose of ascertaining documents having particular features or for the purpose of ascertaining particular information from documents. A communication session information server, a document management server and a communication session server can also be implemented as respective functions of the same server.

One aspect of the invention can clearly be seen in that active communication sessions are ascertained by an information server which is configured for this purpose. A user of the activity information requests the active communication sessions from the information server. The information server then requests the active sessions controlled by the session servers from document management servers with which the individual session servers are associated and forwards the collected active sessions to the challenging user.

As a good example, it can also be put in such a way that the information about active communication sessions is first routed from one or more communication session servers to a respective document management server with which the communication session servers are associated, and the document management server first of all collects and stores said information. As soon as a user asks the communication session information server for active communication sessions, the communication session information server for its part outputs challenges for document contents about active communication sessions to document management servers which are suitable for this. The contacted document management servers each respond to the communication session information server. The communication session information server collects the information obtained from the various document management servers about active communication sessions and forwards it in a package to the challenging user.

This gives rise to the advantage that it becomes possible to check active communication sessions which are controlled by different servers. In particular, this allows active communication sessions to be checked which are controlled in different networks (for example provided by different network operators). A further advantage arises from the fact that the active sessions of a plurality of communication session servers are collected by the information server and are sent to the challenging user in a single message. This saves signaling complexity.

Yet further advantages arise by virtue of the aspect that a document management server may have a plurality of associated communication session servers. This allows flexible extension by additional communication session servers, the latter not needing to be known to the information server itself. In addition, yet more signaling complexity is saved, since the information server does not need to contact each communication session server individually for a challenge. By way of example, a network of a network operator may contain a central document management server with which all the communication session servers in this network are associated.

The aspect of the invention that a piece of information about active communication sessions is stored in a document managed by the document management server, wherein the document contains a list in which active communication sessions controlled by the communication session server need to be indicated, gives rise to the advantage that it becomes possible to access the information quickly and to quickly find the active communication sessions.

Further exemplary embodiments of the invention can be found in the dependent patent claims and in the description which follows. In this case, where applicable, the explanations relating to the methods also apply mutatis mutandis to the apparatuses, and vice versa.

In accordance with one exemplary embodiment of the invention, the received request is a request from a communication session participant appliance and the first response is sent to the communication session participant appliance.

Expressed in clear terms, a challenging user may be the user of a communication terminal or participant appliance, expressed in more general terms an appliance which a participant can use to participate in a communication session (communication session participant appliance), for example. In this case, the received request comes from the appliance of the user. The received request can also come from another communication appliance, for example from a server in a communication network, and the first response can be returned to the communication appliance, for example the server in a communication network. In this case, the communication appliance, for example the server, can itself be regarded as a user.

In accordance with another exemplary embodiment of the invention, the received request may contain one or more conditions for active communication sessions which are to be ascertained. The first response may be in a form such that it indicates only such active communication sessions as fulfill the one or more conditions or indicates that such communication sessions currently do not exist.

One aspect of the exemplary embodiment can be seen clearly in that the challenging user uses his challenge to define conditions for the active communication sessions which are to be reported back. The information server then checks the conditions and reports back only such active sessions as meet the conditions, i.e. fulfill them. This has the advantage that appropriate definition of conditions which are placed on the active sessions which are to be reported back achieves a situation in which only such sessions as are of interest to the challenging user are reported back.

The one or more conditions may relate to a piece of presence information and/or a piece of location information.

In accordance with a further exemplary embodiment of the invention, the communication session information server checks whether the one or more active communication sessions which are controlled by the communication session servers associated with the at least one document management server and which are indicated in the respective challenge responses from the at least one document management server fulfill the one or more conditions.

Provision may be made for a second response to be sent by the communication session information server, said second response indicating one or more active communication sessions which are controlled by the communication session servers associated with the at least one document management server and which were not indicated in the first response. This allows active communication sessions found to be sent to a challenging user in a plurality of notification messages. This has the advantage that communication sessions found first can be communicated more quickly.

In accordance with one exemplary embodiment of the invention, the communication sessions indicated in the second response which were not indicated in the first response contain one or more communication sessions which were not active and/or did not fulfill the one or more conditions at the time of the transmission of the first response. This has the advantage that the receiver of the second response can be automatically informed about activity changes from communication sessions for the purpose of starting an activity.

In accordance with a further exemplary embodiment of the invention, the communication session information server sends a third response which indicates that one or more of the active communication sessions indicated in the first and/or second response are no longer active and/or no longer fulfill the one or more conditions at the time of the transmission of the third response. This has the advantage that the receiver of the third response can be automatically informed about activity changes from communication sessions for the purpose of stopping an activity.

In accordance with one exemplary embodiment of the invention, after the first response, a further response which updates the first response is sent via the communication session information server. Updating the first response may involve communication sessions being indicated as active which were not indicated as active in the first response. In addition, updating the first response may involve communication sessions being indicated as not active which were indicated as active in the first response.

Denoting the responses as first, second, third, fourth or further response serves to distinguish responses, i.e. messages, of different content, easily; in particular, it does not indicate an imperative chronological order for the responses. The contents of two or more of these responses can also be sent together in the form of a single response message.

In accordance with one exemplary embodiment of the invention, the concept that a communication session is indicated may involve a group address for the communication session being specified and/or participant addresses for the communication session being specified. This has the advantage that it allows the communication session or the participant group for the communication session to be explicitly identified. It is possible for a communication session to be indicated by the participant addresses of all participants associated with the communication session. It is also possible for the participant addresses of the participants who are currently actively participating in the communication session to be marked, or for only the participant addresses of the participants who are currently actively participating in the communication session to be indicated. This has the advantage that a piece of information is provided about which of the potential participants in a communication session are actually currently actively participating in the communication session.

The request, the first response, the second response, the third response or the fourth response can each be transmitted by means of a message in accordance with a communication control protocol, wherein the communication control protocol may be one of the following protocols (but is not limited to these examples): Session Initiation Protocol SIP, RealTime Control Protocol RTCP, HyperText Transport Protocol http, File Transfer Protocol FTP, Simple Mail Transfer Protocol SMTP, XML Configuration Access Protocol XCAP, where XML stands for Extensible Markup Language. If a message based on SIP is used for transmission, messages of the "SIP SUBSCRIBE", "SIP NOTIFY" or "SIP MESSAGE" type or an SIP message redefined specifically for this purpose may be used. It is also possible to use messages of "Search Request" or "Search Results" type.

In accordance with another exemplary embodiment of the invention, provision may be made, instead of interchange of messages in accordance with a protocol, for the communication session information server to be used to store a challenge with conditions. The information server then provides a document, for example an XML document, i.e. a document in a format based on the Extensible Markup Language (XML), which contains all the active sessions with the stored properties. The information server updates the document when active sessions fulfilling the conditions are started or ended. In order to find active sessions which fulfill the conditions, the challenging communication appliance reads this document, for example using XCAP (XML Configuration Access Protocol) or Xpath (XML path language).

Provision may also be made for the document provided by the information server to be used to store all active sessions together with their properties. In this case, the terminal of a challenging user can read the document and ascertain active sessions therefrom which meet particular conditions itself.

Instead of notifying a user about changes in active communication sessions as soon as sessions are changed, provision may be made for the altered sessions to be stored in a list in the terminal of the user. The list can then be viewed by the user at another time.

The communication sessions based on exemplary embodiments of the invention may be communication sessions in which communication is effected by means of realtime media streams. It is possible for the communication sessions to be telecommunication conference sessions. The telecommunication conference sessions may be Push-to-Talk over Cellular telecommunication conference sessions.

In accordance with another exemplary embodiment of the invention, the respective challenges for document contents which indicate whether the communication sessions are currently active contain a search request for the respective document management server to search a document, wherein the document contains a list which indicates active communication sessions controlled by the at least one communication session server associated with the respective document management server.

In accordance with a further exemplary embodiment of the invention, the document management server is an XDM server, also called an XDMS, i.e. an XML document management server.

BRIEF DESCRIPTION OF THE DRAWINGS

Exemplary embodiments of the invention are illustrated in the figures and are explained in more detail below.

In the figures

DETAILED DESCRIPTION

The following detailed description refers to the accompanying drawings that show, by way of illustration, specific details and embodiments in which the invention may be practiced.

Within the context of this description, the terms "connected" and "coupled" are used to describe both direct and indirect connection and also direct or indirect coupling. In the figures, identical or similar elements are provided with identical reference symbols where expedient.

Figure 1:
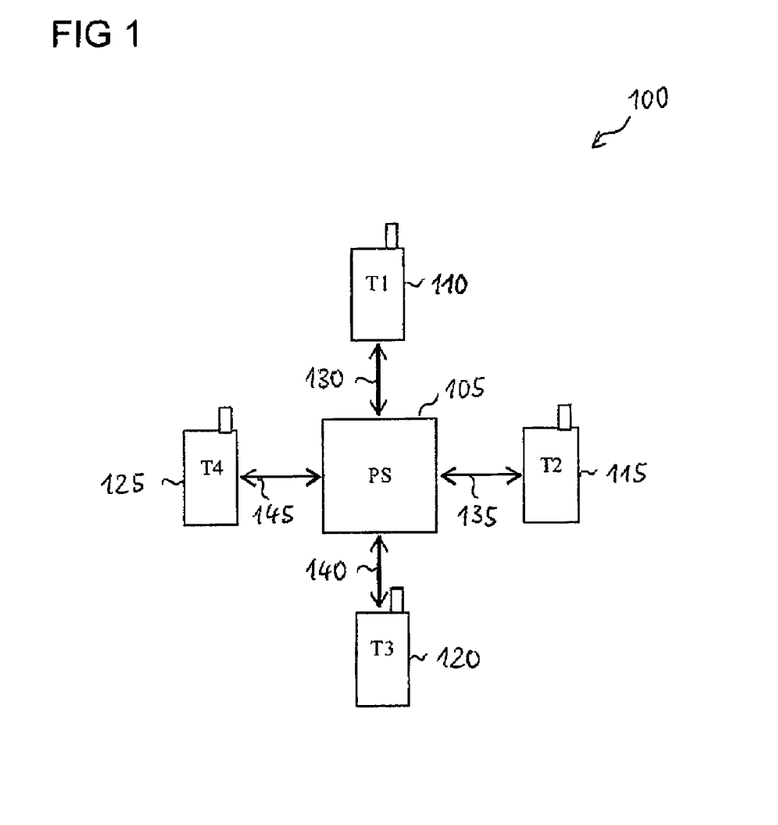
FIG. 1 shows a block diagram of a telecommunication conference system based on an exemplary embodiment of the invention.

FIG. 1 shows a simplified illustration of a telecommunication conference system 100 based on an exemplary embodiment of the invention.

The telecommunication conference system 100 is designed on the basis of Push-to-Talk over Cellular (PoC) in line with the Open Mobile Alliance (OMA) standard, with the individual components additionally being configured such that they can perform the methods and communication protocols described below. The fundamental architecture of the telecommunication conference system 100 described in FIG. 1 applies to all the exemplary embodiments described below.

The telecommunication conference system 100 has a central PoC server PS 105 (PTT server) as conference server, and also a plurality of mobile radio communication terminals, for example mobile radio telephones 110, 115, 120, 125, wherein the mobile radio communication terminals 110, 115, 120, 125 each contain a PoC client unit which is configured for communication in line with the communication standard for Push-to-Talk over Cellular. The mobile radio communication terminals 110, 115, 120, 125 are coupled to the PTT server 105 via a respective air interface by means of a respective radio communication link 130, 135, 140, 145. Hence, the participants T1, T2, T3, T4, and hence the users of the mobile radio communication terminals 110, 115, 120, 125, communicate with one another not directly but rather by means of the central PTT server 105.

The PTT server 105 is an example of a communication session server. The mobile radio communication terminals 110, 115, 120, 125 are respective examples of communication session participant appliances.

In line with this exemplary embodiment of the invention, four participants T1, T2, T3, T4, and hence four mobile radio communication terminals 110, 115, 120, 125, are shown by way of simplification, even though an arbitrary number of participants and mobile radio communication terminals may be provided. The participants T1, T2, T3, T4 communicate using audio, that is to say by means of speech, with the respective participant in each case being exclusively assigned a communication right, in line with this exemplary embodiment of the invention a right to talk, by the PTT server 105 on the basis of the half-duplex method.

The assignment of the right to talk, generally of the communication right, and hence the control of communication rights are effected by the PTT server 105 using messages based on the RealTime Control Protocol (RTCP) communication protocol.

Requested communication rights are stored in a queue which is implemented in a memory of the PTT server 105. When a communication right is assigned, each participant is assigned a time slot in which he can transmit voice data to the other participants in the telecommunication conference without being able to be interrupted by the other participants. During this time, the other participants cannot introduce data into the telecommunication conference, that is to say that they are not provided with a communication right.

In alternative exemplary embodiments of the invention, the telecommunication conference system 100 may be configured in line with the IETF conferencing framework, a proposal by the "Internet Engineering Task Force" (IETF) committee.

In addition, the mobile radio communication terminals 110, 115, 120, 125 may be configured as cordless communication terminals or else as wired communication terminals. The communication terminals may be integrated in a computer, for example, in a personal computer, in a work station, in a personal digital assistant (PDA), a laptop, a notebook, generally any system provided with a processor which is suitable for participation in a telecommunication conference or communication session.

Figure 2:
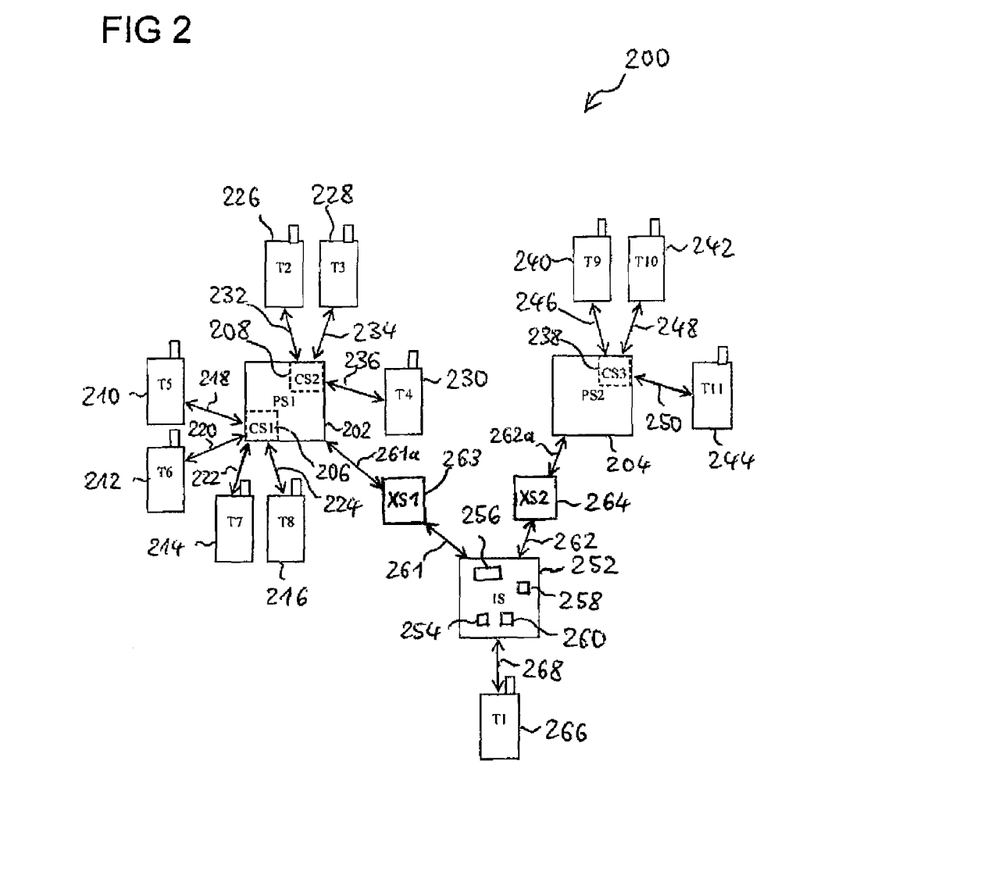
FIG. 2 shows an extended illustration of a block diagram of a telecommunication conference system based on an exemplary embodiment of the invention.

FIG. 2 shows an extended illustration of a block diagram of a telecommunication conference system 200 based on an exemplary embodiment of the invention.

The telecommunication conference system 200, which is likewise configured in line with a PTT standard, for example in line with PoC, as described above in relation to FIG. 1, has a first PTT server PS1 202 and a second PTT server PS2 204 in this example.

In the example shown in FIG. 2, it is assumed that the PTT server 202 controls the two communication sessions CS1 206 and CS2 208. The communication session CS1 206 is a communication session in a predefined (prearranged) PTT group, the participants in which can communicate with one another by means of the mobile radio telephones 210, 212, 214, 216, which are coupled to the PTT server PS1 202 by means of respective mobile radio links 218, 220, 222, 224. The communication session CS2 208 is assumed to be a chat group. The participants in the chat group can use their mobile radio telephones 226, 228, 230, which are coupled to the PTT server PS1 202 by means of respective mobile radio links 232, 234, 236, to communicate with one another.

In addition, it is assumed that the PTT server PS2 204 controls the communication session CS3 238. The communication session CS3 238 is an ad hoc session, the participants in which can use their respective mobile radio telephones 240, 242, 244, which are coupled to the PTT server PS2 204 via respective mobile radio links 246, 248, 250, to communicate with one another.

The communication sessions CS1 206, CS2 208, CS3 238 may in each case be active or not active at a particular time. A communication session is active when the communication system currently provides the necessary means for communication. If the means are not available (for example, because the necessary communication channels for transmitting data are not yet prepared), the communication session is not active.

In addition, a communication session information server IS 252 is provided. The communication session information server IS 252 has a request acceptance unit 254, a challenge unit 256, a condition checking unit 258 and a response unit 260.

The communication session information server 252 is coupled to the XDM server XS1 263 and to the XDM server XS2 264 by communication links 261 and 262, for example for radio communication or for wired communication, which are suitable for the data communication between servers. The XDM server XS1 263 is for its part coupled to the PTT server PS1 202 by suitable communication links 261a, and the XDM server XS2 264 is for its part coupled to the PTT server PS2 204 by suitable communication links 262a.

A mobile radio telephone 266 associated with a challenging user T1 is coupled to the communication session information server 252 by means of the radio communication link 268 directly or indirectly (by way of example, indirectly means with the interposition of forwarding entities, for example mobile radio network units, and possibly further communication channels, including wired ones).

The mobile radio telephone 266 is an example of a communication session participant appliance. The PTT servers PS1 202 and PS2 204 are examples of communication session servers. The XDM servers XS1 263 and XS2 264 are examples of document management servers.

Figure 3:
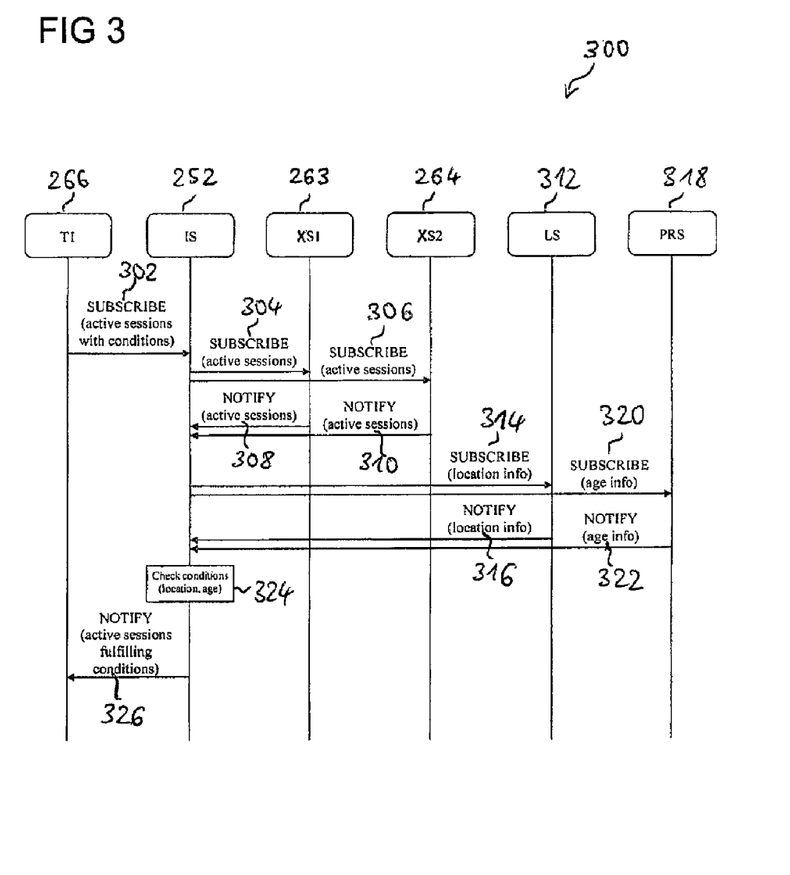
FIG. 3 shows a message flowchart showing the message flow for ascertaining active communication sessions based on an exemplary embodiment of the invention.

FIG. 3 shows a message flowchart showing the message flow for ascertaining active communication sessions based on an exemplary embodiment of the invention. In this case, the illustration of the message flow is based on the architecture of the telecommunication conference system 200 shown in FIG. 2.

In this exemplary embodiment, it is assumed that the communication sessions CS1 206, CS2 208, CS3 238 are currently all active.

A user of PTT services wishes to use the mobile radio telephone 266 to participate in a PTT session. He wishes to communicate with other participants who belong to his age group (say between 20 and 30 years old) and who are currently residing in the same city as him (say Munich).

The user of the mobile radio telephone 266 uses it to activate the function of ascertaining active communication sessions. The mobile radio telephone 266 sends a challenging message to the communication session information server 252. The challenging message contains the conditions "city of Munich" and "between 20 and 30 years old".

The challenge is sent by means of Session Initiation Protocol (SIP) in the form of an SIP-SUBSCRIBE message 302. The text added to the message type SUBSCRIBE in FIG. 3 for the illustration of the message 302 symbolizes the fundamental content of the message. A challenge is sent for "active sessions" and "with conditions".

The following pseudo-code illustration gives a more detailed description of the general structure of the SIP-SUBSCRIBE message 302 based on an exemplary embodiment of the invention:

```
SUBSCRIBE sip:6172531000@mit.edu SIP/2.0
From: <sip:6172531000@mit.edu>;tag=11005c11005
To: <sip:6172531000@mit.edu>;tag=765268780
Call-Id: 9c0a1ef37f461a8feb7b80fe84855a4f
Cseq: 1451 SUBSCRIBE
Contact: sip:6172531000@ 18.10.0.79
Event: active-session
Accept: application/active-session-summary
Expires: 0
Date: Wed, 05 Jan 2005 02:57:34 GMT
Accept-Language: en
Supported: sip-cc, sip-cc-01, timer, replaces
User-Agent: Pingtel/2.1.11 (VxWorks)
Content-Length: 30
Location="Munich"
Age="20-30"
```

In the pseudo code, "event: active-session" indicates that information about active communication sessions is being requested. "Expires: 0" indicates that active sessions are intended to be communicated only once. The text in the message body 'Location="Munich" Age="20-30"' defines conditions for the active communication sessions which are to be returned.

The SIP-SUBSCRIBE message 302 is received by the communication session information server IS 252, to be more precise by the request acceptance unit 254. This is an example of the reception of a request to ascertain active communication sessions via a communication session information server. This is also an example of the received request containing one or more conditions for active communication sessions which are to be ascertained.

The communication session information server IS 252 then transfers respective challenges for document contents which indicate whether communication sessions are currently active to the XDM servers XS1 263 and XS2 264 as SIP-SUBSCRIBE messages 304, 306 or as XCAP-GET messages using its challenge unit 256. The messages 304, 306 each contain a reference to "active sessions", but no further condition information. The SIP message type SUBSCRIBE and the XCAP message type GET are used in the messages 304 and 306 to retrieve information.

The XDM servers XS1 263 and XS2 264 respond to the communication session information server IS 252 with SIP-NOTIFY messages or with XCAP-OK messages. FIG. 3 shows these as messages 308, 310 in each case with the type NOTIFY and the content reference "active sessions". The notification message 308 from the XDM server XS1 263 contains identifiers for the communication sessions CS1 206 and CS2 208 of the PTT server PS1 202 and the addresses of the participants in these communication sessions. The notification message 310 from the XDM server XS2 264 contains an identifier for the communication session CS3 238 of the PTT server PS2 and the addresses of the participants in the communication session CS3. The identifier of the communication session CS1 206 is the address of the predefined PTT group. The identifier of the communication session CS2 208 is the address of the chat group. The identifier of the communication session CS3 238 is an address temporarily allocated by the PTT server PS2 204.

The messages 308, 310 are received by the communication session information server IS 252, to be more precise by its challenge unit 256. This is an example of the reception of respective challenge responses from the at least one document management server which indicate one or more active communication sessions controlled by the at least one communication session server associated with the respective document management server.

When the communication session information server IS 252 has received the notification messages from the document management servers X1 263 and X2 264, it requests from a location server LS 312 the geographical location of the participants in the communication sessions CS1 206, CS2 208, CS 238. This is done using the SIP-SUBSCRIBE message 314, which in the illustration in FIG. 3 contains "location info" as a content reference. The location server LS 312 returns the requested information to the communication session information server IS 252 using the SIP-NOTIFY message 316.

Furthermore, the communication session information server IS 252 requests from a presence server PRS 318 the age of the participants in the communication sessions CS1 206, CS2 208, CS3 238. This is done using the SIP-SUBSCRIBE message 320, which in the illustration in FIG. 3 contains the content reference "age info". The presence server 318 responds with the SIP-NOTIFY message 322, which transmits the desired information to the communication session information server IS 252.

The communication session information server IS 252 then uses its condition checking unit 258 to check the conditions contained in the message 302, i.e. the original challenge, using the location information and age information. This is symbolized in FIG. 3 by the event field 324, which relates to "check conditions" and "location, age".

This is an example of checking whether the one or more active communication sessions, controlled by the communication session servers associated with the at least one document management server, which are indicated in the respective challenge response from the at least one document management server fulfill the one or more conditions.

The communication session information server IS 252 finds that only the communication session CS2 208 fulfills the imposed conditions. Therefore, the communication session information server IS 252 sends a notification message to the mobile radio telephone 266 which contains the identifier of the communication session CS2 208. The notification message is sent as an SIP-NOTIFY message 326 by the response unit 260 of the information server IS 252. The additional label "active sessions fulfilling conditions" of the message 326 in FIG. 3 symbolizes that the message indicates active sessions which fulfill the conditions transmitted with the message 302.

This is an example of sending a first response which indicates one or more active communication sessions controlled by the communication session servers associated with the at least one document management server.

The pseudo-code illustration below provides a more detailed description of the general structure of the SIP-NOTIFY message 326 based on an exemplary embodiment of the invention:

```
NOTIFY sip:6172531000@18.142.4.231 SIP/2.0
Content-type: application/simple-message-summary
Content-Length: 113
Event: active-session
From: <sip:6172531000@mit.edu>;tag=11005c11005
To: <sip:6172531000@mit.edu>;tag=765268780
Call-Id: 9c0a1ef37f461a8feb7b80fe84855a4f
Cseq: 2944 NOTIFY
Contact: sip:18.7.21.118:5110
Date: Wed, 05 Jan 2005 02:57:35 GMT
```

-continued

```
Max-Forwards: 20
User-Agent: Pingtel/2.2.0 (Linux)
Accept-Language: en
Supported: sip-cc-01, timer
Session-ID=<sip:7656354@mit.edu>
Participants=<sip:567485433@mit.edu>;<sip:887592@
mit.edu>;sip:528857@mit.edu>
```

In the pseudo code, the text of the message body is used to communicate the addresses of the communication session and also of the individual participants as "session-ID" (session identifier) and "participants".

Figure 4:
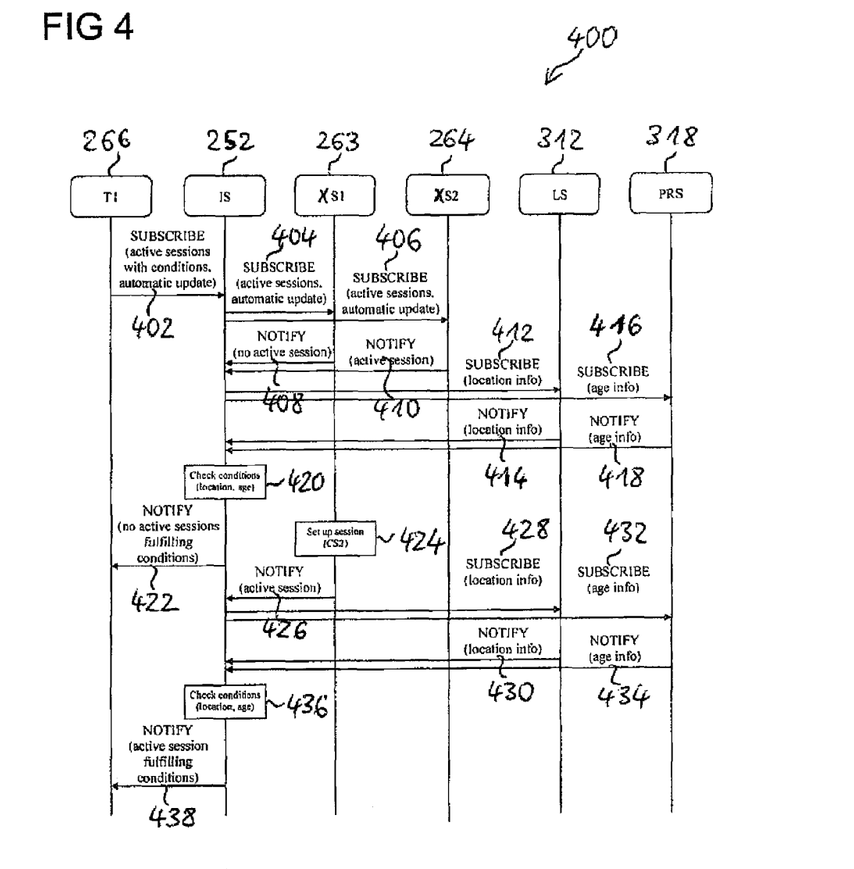
FIG. 4 shows a message flowchart showing the message flow for ascertaining active communication sessions based on another exemplary embodiment of the invention.

FIG. 4 shows a message flowchart 400 showing the message flow for ascertaining active communication sessions in line with another exemplary embodiment of the invention. In this exemplary embodiment, the architecture of the telecommunication conference system 200 which is shown in FIG. 2 is likewise taken as a basis. English labels which are shown for messages in FIG. 4 which have already been used for messages in FIG. 3 have the same meaning as indicated in the description for FIG. 3.

For the exemplary embodiment shown in FIG. 4, it is assumed that the two communication sessions controlled by the PTT server PS1 202 are currently not active. At first, only the communication session CS3 238, which is controlled by the PTT server PS2 204, is assumed to be active.

A user of the mobile radio telephone 266 wishes to participate in a PTT session. He is interested in communicating with participants who are from his age group (between 20 and 30 years old) and who are currently residing in his city (Munich). The user uses his mobile radio telephone 266 to activate the function for ascertaining active communication sessions. The mobile radio telephone 266 sends a request to ascertain active communication sessions to the communication session information server IS 252 in the form of the SIP-SUBSCRIBE message 402. The request contains the conditions "city of Munich" and "between 20 and 30 years old". The term "automatic update" illustrated in chart 400 for the message 402 symbolizes that the message 402 also contains an information element which communicates that the mobile radio telephone 266 is intended to be automatically informed about new active PTT sessions.

The pseudo-code illustration below describes the general structure of the SIP-SUBSCRIBE message 402 based on an exemplary embodiment of the invention:

```
SUBSCRIBE sip:6172531000@mit.edu SIP/2.0
From: <sip:6172531000@mit.edu>;tag=11005c11005
To: <sip:6172531000@mit.edu>;tag=765268780
Call-Id: 9c0a1ef37f461a8feb7b80fe84855a4f
Cseq: 1451 SUBSCRIBE
Contact: sip:6172531000@ 18.10.0.79
Event: active-session
Accept: application/active-session-summary
Expires: 3600
Date: Wed, 05 Jan 2005 02:57:34 GMT
Accept-Language: en
Supported: sip-cc, sip-cc-01, timer, replaces
User-Agent: Pingtel/2.1.11 (VxWorks)
Content length: 30
Location="Munich"
Age="20-30"
```

In the pseudo-code illustration, the term "event: active-session" indicates that information about active communication sessions is being requested. The term "expired: 3600" indicates that updates within the next 3600 seconds, that is to say within the next hour, need to be communicated automatically. The text in the message body "location=Munich age=20-30" defines conditions for the active communication sessions which are to be returned.

The information server IS 252, to be more precise its challenge unit 256, then sends respective challenges to determine whether communication sessions are currently active to the XDM servers XS1 263 and XS2 264 in the form of the SIP-SUBSCRIBE messages 404, 406 or as XCAP-GET messages. The SIP message type SUBSCRIBE and the XCAP message type GET are used in the messages 404 and 406 to retrieve information. The messages 404, 406 do not contain any condition information. The respective label "automatic update" in the messages 404, 406 in chart 400 symbolizes that these two messages each contain an information element which communicates that the communication session server IS 252 is intended to be automatically informed about new active PTT sessions which are controlled by the PTT servers 202, 204.

The XDM servers XS1 263 and XS2 264 respond to the communication session information server IS 252 in each case with notification messages in the form of SIP-NOTIFY messages or in the form of XCAP-OK messages. Since the PTT server PS1 202 associated with the XDM server XS1 263 currently does not control any active communication sessions and accordingly the XDM server XS1 263 is unaware of any active communication sessions, its notification message 408 does not contain any identifiers for communication sessions. The presentation of the message 408 in chart 400 with the term "no active session" symbolizes that the message 408 indicates that active communication sessions which are controlled by the PTT server PS1 202 currently do not exist. The notification message 410 from the XDM server XS2 264 contains an identifier for the communication session CS3 238 of the PTT server PS2 204 and the addresses of the participants in this communication session.

The messages 408, 410 are received by the communication session information server IS 252. The reception of the message 408 is an example of reception of a challenge response from a document management server which indicates that active communication sessions controlled by the at least one communication session server associated with the document management server currently do not exist.

The communication session information server IS 252 then requests, in a similar manner to that described in the exemplary embodiment in FIG. 3, the geographical location of the participants in the communication session CS3 238 from the location server LS 312 using the message 412. The location server 312 responds with the notification message 414, which is received by the communication session information server IS 252. Similarly, the communication session information server IS 252 uses the message 416 to request from the presence server PRS 318 the age of the participants in the communication session CS3 238. The presence server PRS 318 responds with the notification message 418, which is received by the communication session information server IS 252.

The communication session information server IS 252 then uses its condition checking unit 258 to check, on the basis of the location information and age information obtained, whether the conditions contained in the message 402 are fulfilled, which is illustrated by the event field 420 in a similar manner to FIG. 3. In this exemplary embodiment the communication session information server 252 establishes that the communication session CS3 238 does not fulfill the conditions. Therefore, it sends the notification message 422, which does not contain any identifier for a communication session, to the mobile radio telephone 266. The term illustrated for the message 422 "no active sessions fulfilling conditions" illustrates that no active communication sessions fulfilling conditions are being communicated.

This is an example of the first response indicating that such communication sessions as fulfill the one or more conditions currently do not exist.

As time passes, the communication session CS2 208 is now assumed to be initiated and then controlled by the PTT server PS1 202, as symbolized by the event field 424 with the label "configured session". The communication session CS2 208 has therefore changed its status from "not active" to "active". When the communication session has been configured, the PTT server PS1 202 sends an appropriate piece of information to the XDM server XS1 263. The XDM server XS1 263 now knows that the document which contains the list of active sessions on the PTT server PS1 263 has been changed, and it therefore sends the notification message 426, illustrated in FIG. 4 by the label "active session", to the communication session information server IS 252, which notification message communicates that the communication session CS2 208 of the PTT server PS1 202 is now active. The message 426 also contains an identifier for the communication session CS2 208 and the addresses of the participants in this communication session.

The communication session information server IS 252 then uses the message 428 to request from the location server LS 312 the geographical location of the participants in the communication session CS2 208 and receives the location information by means of the message 430. In addition, the communication session information server IS 252 requests from the presence server PRS 318 the age of the participants in the communication session CS2 208 and receives the age information by means of the message 434.

Next, the communication session information server IS 252 checks the location information and age information received with the messages 430, 434 to determine whether the conditions contained in the message 402 are fulfilled. This is symbolized in chart 400 by the event field 436. The communication session information server IS 252 establishes that the communication session CS2 208 does fulfill the conditions. Therefore, the communication session information server IS 252 uses its response unit 260 to send the notification message 438, which contains the identifier of the communication session CS2 208, to the mobile radio telephone 266. By way of example, the mobile radio telephone 266 can then output a piece of information about the new active communication session to the user and invite the user to participate in the session.

The sending of the message 438 by the communication session information server IS 252 is an example of the sending of a second response which indicates one or more active communication sessions which are controlled by the communication session servers associated with the at least one document management server and which were not indicated in the first response, these communication sessions containing one or more communication sessions which were not active and/or did not fulfill the one or more conditions at the time of the transmission of the first response.

In accordance with another exemplary embodiment of the invention, one or more messages, for example the messages 304, 306, 308, 310, 404, 406, 408, 410, or 426, interchanged between the communication session information server IS 252 and the XDM servers XS1 263 and XS2 264, refer not to "active sessions" or "active session" or "no active session" but rather to "active session list" or "empty active session list" or "active session list modification".

Figure 5:
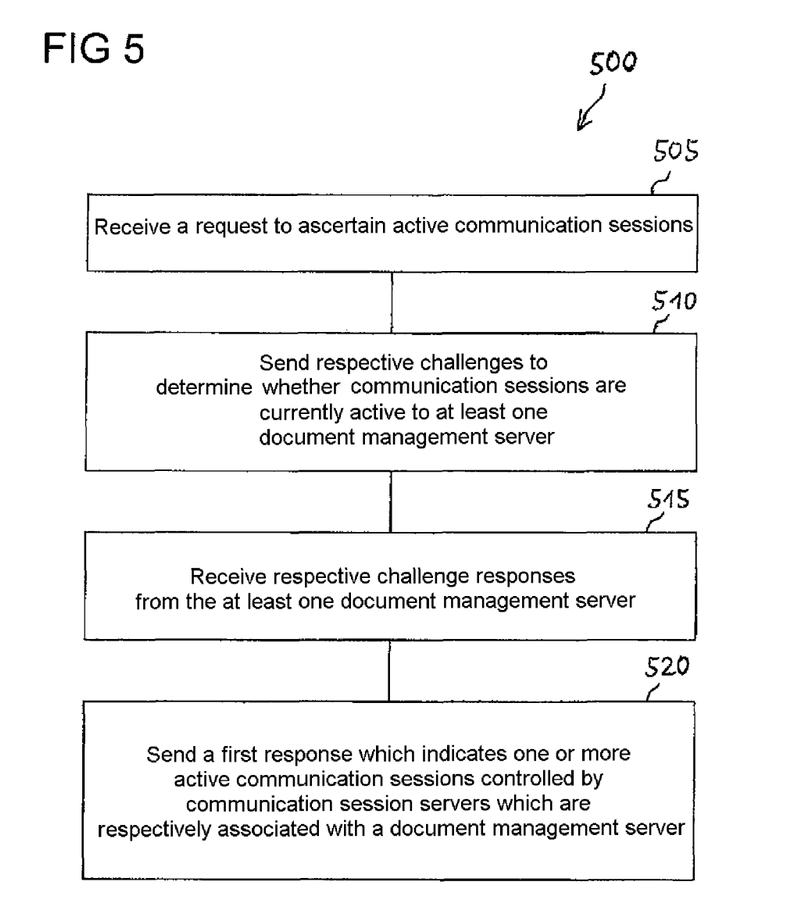
FIG. 5 shows a flowchart showing a method based on a further exemplary embodiment of the invention.

FIG. 5 shows a flowchart 500 showing a method for ascertaining active communication sessions based on an exemplary embodiment of the invention. The exemplary embodiment shown in FIG. 5 can be combined with all other exemplary embodiments which have been described.

In 505, a request to ascertain active communication sessions is received by a communication session information server.

Optionally, the received request may contain one or more conditions for active communication sessions which are to be ascertained.

In 510, respective challenges for document contents which indicate whether communication sessions are currently active are sent from the communication session information server to at least one document management server, which has at least one respective associated communication session server, wherein in the case of precisely one document management server the latter has at least two associated communication session servers.

In 515, respective challenge responses from the at least one document management server, which indicate one or more active communication sessions controlled by the at least one communication session server associated with the respective document management server or which indicate that such communication sessions currently do not exist, are received by the communication session information server.

Optionally, the communication session information server can check whether the one or more active communication sessions which are controlled by the communication session servers associated with the at least one document management server and which are indicated in the respective challenge responses from the at least one document management server fulfill the one or more conditions. Optionally, one or more further challenges for a piece of information which is relevant to the one or more conditions for active communication sessions which are to be ascertained can be sent. Optionally, one or more further challenge responses with such information can be received by the communication session information server. Optionally, evaluation of a received piece of information which is relevant to the one or more conditions for active communication sessions which are to be ascertained can be used to check whether the one or more conditions for active communication sessions which are to be ascertained are fulfilled.

In 520, a first response which indicates one or more active communication sessions controlled by the communication session servers associated with the at least one document management server or which indicates that such communication sessions currently do not exist is sent by the communication session information server.

Figure 6:
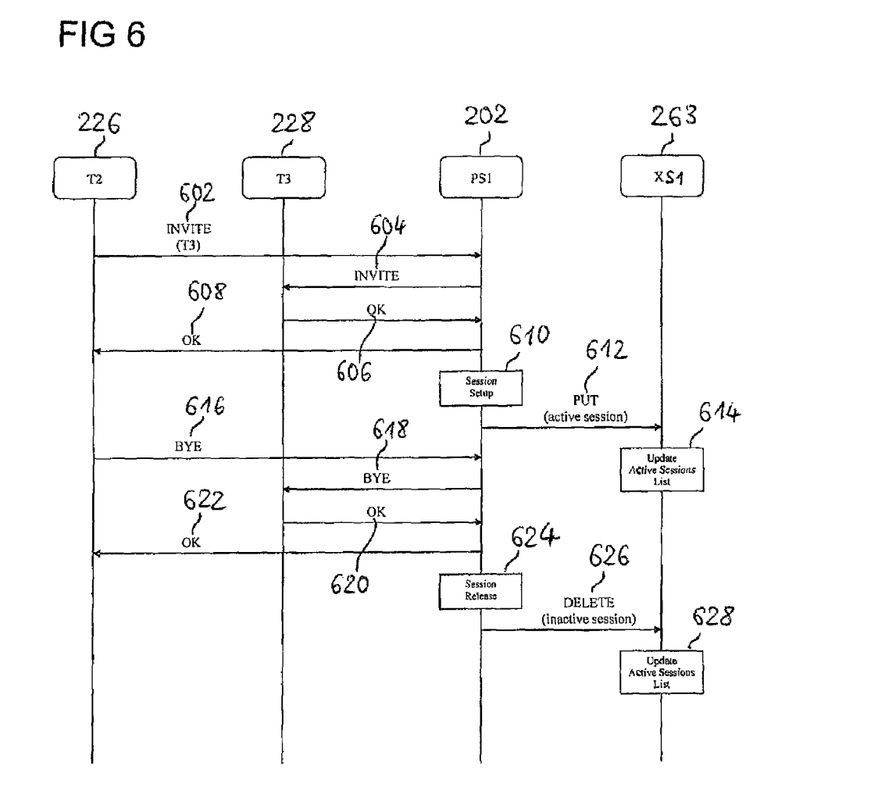
FIG. 6 shows a message flowchart showing a message flow based on another exemplary embodiment of the invention.

FIG. 6 shows a message flowchart 600 showing a message flow based on another exemplary embodiment of the invention.

In the sequence shown and using the message flow shown, the PTT server PS1 202 first of all sets up a communication session with the participants T2 226 and T3 228, then notifies the XDM server XS1 263 of a piece of information about the active session, later closes the communication session again and notifies the XDM server XS1 263 of a piece of information about the session which is no longer active.

The participant T2 226 wishes to configured a PTT session with T3 228 and to this end sends an SIP-INVITE message 602 to the PTT server PS1 202. FIG. 6 shows this message with the type INVITE and the content reference T3. The PTT server PS1 202 uses the message 604, which is likewise of INVITE type, to invite the participant T3 228 to join the session, and said participant responds with the acknowledgement message 606 of OK type. The PTT server PS1 202 uses the acknowledgement message 608 to signal to the session initiator, the participant T2 226, that the invited participant has agreed, and sets up the communication session between T2 and T3 in 610, denoted by "Session Setup" in FIG. 6.

The PTT server PS1 202 uses the XCAP-PUT message 612 to notify the XDM server XS1 263 of a piece of information about the now active communication session. The message 612 is shown with the PUT type and the content reference "active session" in FIG. 6.

This is an example of the reception by a document management server of a piece of information which indicates one or more active communication sessions controlled by a communication session server associated with the document management server.

In 614, denoted by "Update Active Sessions List" in FIG. 6, the XDM server XS1 263 updates a document with a list of active communication sessions and enters the information obtained with the message 612 into the document. By way of example, this is done by virtue of a session identifier being entered into the list. The relevant session can then be ascertained as an active session from the document.

This is an example of the storage of the received information in a document managed by the document management server, wherein the document contains a list in which active communication sessions controlled by the communication session server need to be indicated.

The participant T2 226 now wishes to terminate the PTT session with T3 228 again, and to this end sends an SIP-BYE message 616 to the PTT server PS1 202. FIG. 6 shows this message with the type BYE. The PTT server PS1 202 dismisses the participant T3 228 from the session with the message 618, which is likewise of BYE type, and said participant responds with the acknowledgement message 620 of OK type. The PTT server PS1 202 uses the acknowledgement message 622 to signal to the session initiator, the participant T2 226, that the invited participant has agreed, and clears down the communication session between T2 and T3, i.e. releases the communication resources used for the session again, in 624, denoted in FIG. 6 by "Session Release".

The XCAP-DELETE message 626 is used by the PTT server PS1 202 to notify the XDM server XS1 263 of a piece of information about the now no longer active, i.e. inactive, communication session. The message 626 is shown in FIG. 6 with the type DELETE and the content reference "inactive session".

In 628, denoted in FIG. 6 by "Update Active Sessions List", the XDM server XS1 263 updates the document with the list of active communication sessions and takes the information obtained with the message 626 as a basis for deleting the no longer active communication session from the list. By way of example, this is done by deleting the relevant session identifier in the list. It is then no longer possible for the relevant session to be ascertained as an active session from the document.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for ascertaining active communication sessions, the method comprising:
   receiving, by an information server from a first appliance, a request to ascertain active communication sessions, wherein the request includes at least one user-defined condition for active communication sessions that are to be ascertained;
   transmitting, by the information server, a challenge for document contents, which indicate whether a communication sessions is currently active, the challenge to be transmitted to document management server that is associated with at least one communication session server;
   receiving, by the information server, a challenge response from the document management server, wherein the challenge response indicates whether there exists an active communication sessions controlled by the at least one communication session server;
   transmitting, by the information server, a response to the first appliance, wherein the response indicates an active communication sessions that fulfills the at least one user-defined condition and that does not include the first appliance, wherein the active communication session is between a second appliance and a third appliance connected with one another through the at least one communication session server,
   determining, by the information server, whether one or more active communication sessions not indicated by the response fulfills the at least one user-defined condition; and
   transmitting, by the information server, an update to the response based on the determining.

2. The method as claimed in claim 1, wherein the response indicates only such active communication sessions that fulfill the at least one user-defined condition or indicates that such communication sessions currently do not exist.

3. The method as claimed in claim 2, wherein the at least one user-defined condition relates to at least one of a piece of presence information and a piece of location information.

4. The method as claimed in claim 1, wherein the response is a first response, and the method further comprises:
   transmitting a second response that indicates one or more active communication sessions that are controlled by the at least one communication session server and that were not indicated in the first response.

5. The method as claimed in claim 4,
   wherein the communication sessions indicated in the second response which were not indicated in the first response contain one or more communication sessions which were not active at the time of the transmission of the first response.

6. The method as claimed in claim 4,
   wherein the received request contains the at least one user-defined condition for active communication sessions which are to be ascertained and the first response indicates only such active communication sessions that fulfill the at least one user-defined condition or indicates that such communication sessions currently do not exist; and
   wherein the communication sessions indicated in the second response contain one or more communication sessions which were active communication sessions and did not fulfill the at least one user-defined condition at the time of the transmission of the first response.

7. The method as claimed in claim 4, further comprising:
transmitting a third response, which indicates that one or more of the active communication sessions indicated in the first response are no longer active at the time of the transmission of the third response.

8. The method as claimed in claim 7,
wherein the second response and the third response are transmitted together in the form of a single response message.

9. The method as claimed in claim 7, further comprising:
transmitting a fourth response, which indicates that one or more of the active communication sessions indicated in the first response no longer fulfill the at least one user-defined condition at the time of the transmission of the fourth response, by the communication session information server.

10. The method as claimed in claim 9,
wherein the second response and the fourth response are transmitted together in the form of a single response message.

11. The method as claimed in claim 9,
wherein the third response and the fourth response are transmitted together in the form of a single response message.

12. The method as claimed in claim 1,
wherein an active communication session involves at least one of a group address for the communication session and participant addresses for the communication session.

13. The method as claimed in claim 1, wherein at least one article from the group comprising
request,
first response,
second response,
third response,
fourth response is transmitted by means of a message in line with a communication control protocol.

14. The method as claimed in claim 13, wherein the communication control protocol is one of the following:
Session Initiation Protocol SIP,
RealTime Control Protocol RTCP,
HyperText Transport Protocol http,
File Transfer Protocol FTP,
Simple Mail Transfer Protocol SMTP,
XML Configuration Access Protocol XCAP.

15. The method as claimed in claim 1, wherein the communication sessions are those in which communication is effected by means of realtime media streams.

16. The method as claimed in claim 1, wherein the communication sessions are telecommunication conference sessions.

17. The method as claimed in claim 16, wherein the telecommunication conference sessions are Push-to-Talk over Cellular telecommunication conference sessions.

18. The method as claimed in claim 1, wherein the challenges for document contents includes a search request for the document management server to search a document, wherein the document contains a list which indicates active communication sessions controlled by the at least one communication session server.

19. A communication session information server, comprising:
a request acceptance unit to receive a request to ascertain active communication sessions from a first appliance, wherein the request includes at least one user-defined condition for active communication sessions which are to be ascertained;
a challenge unit to transmit, to a document management server that is associated with at least one communication session server, a challenge for document contents that indicate whether a communication session is currently active, and the challenge unit is to receive a challenge response from the document management server, wherein the challenge response indicates whether there exists an active communication session controlled by the at least one communication session serve; and
a response unit to transmit a response to the first appliance, wherein the response indicates an active communication session that fulfills the at least one user-defined condition and does not include the first appliance, wherein the active communication session is between second and third appliances connected with one another through the at least one communication session server;
a condition checking unit to determine whether one or more active communication sessions not indicated by the response fulfills the at least one user-defined condition
wherein the response unit is to transmit an update to the response based on the determination made by the condition checking unit.

20. The communication session information server as claimed in claim 19, wherein the received request contains the at least one user-defined condition for active communication sessions which are to be ascertained and the response indicates only such active communication sessions that fulfill the at least one user-defined condition or indicates that such communication sessions currently do not exist.

21. The communication session information server as claimed in claim 20, wherein the at least one user-defined condition relates to at least one of a piece of presence information and a piece of location information.

22. The communication session information server as claimed in claim 19, wherein the response is a first response, and wherein the response unit is to send a second response that indicates one or more active communication sessions that are controlled by the at least one communication session server and which were not indicated in the first response.

23. The communication session information server as claimed in claim 22, wherein the communication sessions indicated in the second response which were not indicated in the first response contain one or more communication sessions which were not active at the time of the transmission of the first response.

24. The communication session information server as claimed in claim 19, wherein the response unit is to send a third response which indicates that one or more of the active communication sessions indicated in at least one of the first response and the second response are no longer active at the time of the transmission of the third response.

25. The communication session information server as claimed in claim 19, wherein an active communication session involves at least one of a group address for the communication session and participant addresses for the communication session.

26. The communication session information server as claimed in claim 19, wherein the communication session information server is configured such that at least one article from the group comprising
request,
first response,
second response,
third response
is transmitted by means of a message in line with a communication control protocol.

27. The communication session information server as claimed in claim 26, wherein the communication control protocol is one of the following:
Session Initiation Protocol SIP,
RealTime Control Protocol RTCP,
HyperText Transport Protocol http,
File Transfer Protocol FTP,
Simple Mail Transfer Protocol SMTP,
XML Configuration Access Protocol XCAP.

28. The communication session information server as claimed in claim 19, wherein the communication sessions are those in which communication is effected by means of real-time media streams.

29. The communication session information server as claimed in claim 19, wherein the communication sessions are telecommunication conference sessions.

30. The communication session information server as claimed in claim 29, wherein the telecommunication conference sessions are Push-to-Talk over Cellular telecommunication conference sessions.

31. A method for providing a piece of information about active communication sessions, the method comprising:
receiving, from a first appliance via a communication session server, a piece of information by a document management server, wherein the piece of information indicates one or more active communication sessions controlled by a communication session server associated with the document management server;
storing the received information in a document managed by the document management server, wherein the document contains a list in which active communication sessions controlled by the communication session server are to be indicated, wherein the one or more active communication sessions to be indicated only include communication sessions that fulfill at least one user-defined condition;
receiving a challenge from an information server for document contents that indicate whether the communication sessions are currently active;
investigating the document for active communication sessions that are controlled by the communication session server; and
transmitting, from the document management server to the information server, a challenge response that indicates one or more active communication sessions controlled by the communication session server or which indicates that such communication sessions currently do not exist, wherein the active communication session is between a second appliance and a third appliance connected with one another through the at least one communication session server, and
wherein the information server is to determine whether one or more active communication sessions not indicated by the response fulfills the at least one user-defined condition; and transmit an update to the response based on the determination.

32. A document management server, comprising:
a reception unit to receive a piece of information, from a first appliance via a communication session server, wherein the piece of information indicates one or more active communication sessions controlled by the communication session server associated with a document management server, and the reception unit to receive a challenge from an information server for document contents which indicate whether communication sessions are currently active;
a document management unit to store the received information in a document managed by the document management server, wherein the document contains a list in which active communication sessions controlled by the communication session server need to be indicated, wherein the one or more active communication sessions to be indicated only include communication sessions that fulfill at least one user-defined condition;
an investigation unit to investigate the document for active communication sessions that are controlled by the communication session server; and
a transmission unit to transmit, to the information server, a challenge response that indicates one or more active communication sessions controlled by the communication session server or which indicates that such communication sessions currently do not exist, wherein the active communication session is between a second appliance and a third appliance connected with one another through the at least one communication session server, and
wherein the information server is to determine whether one or more active communication sessions not indicated by the response fulfills the at least one user-defined condition; and transmit an update to the response based on the determination.

* * * * *